US012039846B2

(12) United States Patent
Kim et al.

(10) Patent No.: US 12,039,846 B2
(45) Date of Patent: Jul. 16, 2024

(54) METHOD, APPARATUS, AND SYSTEM FOR PROTECTING PRIVATE INFORMATION FROM ILLEGAL PHOTOGRAPHY BY UNMANNED AERIAL VEHICLE

(71) Applicant: 4DREAM CO., LTD., Andong-si (KR)

(72) Inventors: Won-Kug Kim, Andong-si (KR); Jin-Kyo Shin, Seongnam-si (KR)

(73) Assignee: 4DREAM CO., LTD., Andong-si (KR)

( * ) Notice: Subject to any disclaimer, the term of this patent is extended or adjusted under 35 U.S.C. 154(b) by 0 days.

(21) Appl. No.: 17/786,531

(22) PCT Filed: Dec. 8, 2020

(86) PCT No.: PCT/KR2020/017810
§ 371 (c)(1),
(2) Date: Jun. 17, 2022

(87) PCT Pub. No.: WO2021/125657
PCT Pub. Date: Jun. 24, 2021

(65) Prior Publication Data
US 2023/0038872 A1     Feb. 9, 2023

(30) Foreign Application Priority Data

Dec. 19, 2019 (KR) .................. 10-2019-0170355

(51) Int. Cl.
*G08B 13/196* (2006.01)
*H04N 21/83* (2011.01)

(52) U.S. Cl.
CPC ....... *G08B 13/19686* (2013.01); *H04N 21/83* (2013.01)

(58) Field of Classification Search
None
See application file for complete search history.

(56) References Cited

U.S. PATENT DOCUMENTS

2018/0025649 A1* 1/2018 Contreras ............ G05D 1/0061
                                                               701/3
2018/0293898 A1* 10/2018 Redmann ............... B64U 10/14
(Continued)

FOREIGN PATENT DOCUMENTS

JP     2005-252849 A      9/2005
JP   2020038469 B1 * 10/2019  ............ G06Q 10/02
(Continued)

OTHER PUBLICATIONS

International Search Report for International application No. PCT/KR2020/017810 issued on Mar. 11, 2021.

*Primary Examiner* — Ricky Chin
(74) *Attorney, Agent, or Firm* — McLean IP Global; Jason Y. Pahng

(57) ABSTRACT

Provided is a method of protecting private information from illegal photography by an unmanned aerial vehicle, which includes receiving information about an area to capture, from the unmanned aerial vehicle or an unmanned aerial vehicle pilot, in advance, by wired or wireless communication, transmitting the information about an area to capture, to a private information protection subject who wants to protect private information about the area to capture, by wired or wireless communication, receiving information about a first action to protect private information accompanying image capturing, from the private information protection subject, by wired or wireless communication, and transmitting the information about a first action to protect private information, the information being received from the private information protection subject, to the unmanned aerial vehicle or the unmanned aerial vehicle pilot who is going to capture an image, by wired or wireless communication.

18 Claims, 3 Drawing Sheets

(56) References Cited

U.S. PATENT DOCUMENTS

| | | | | |
|---|---|---|---|---|
| 2018/0365676 | A1* | 12/2018 | Studnicka | G06Q 20/3224 |
| 2019/0220002 | A1* | 7/2019 | Huang | G06T 7/70 |
| 2019/0353794 | A1* | 11/2019 | Hiroi | B64C 39/024 |
| 2019/0362473 | A1* | 11/2019 | Scott | G06V 20/10 |
| 2020/0036886 | A1* | 1/2020 | Kim | G05D 1/101 |
| 2023/0038872 | A1* | 2/2023 | Kim | H04N 21/2146 |

FOREIGN PATENT DOCUMENTS

| | | |
|---|---|---|
| KR | 10-0653303 B1 | 12/2006 |
| KR | 10-2015-0097270 A | 8/2015 |
| KR | 10-2019-0030312 A | 3/2019 |
| KR | 10-2019-0104015 A | 9/2019 |
| KR | 10-2182805 B1 | 11/2020 |

\* cited by examiner

METHOD, APPARATUS, AND SYSTEM FOR PROTECTING PRIVATE INFORMATION FROM ILLEGAL PHOTOGRAPHY BY UNMANNED AERIAL VEHICLE

CROSS REFERENCE TO RELATED APPLICATIONS

This application is a national stage application, filed under 35 U.S.C § 371, of international patent application number PCT/KR2020/017810, filed on Dec. 8, 2020, which is hereby incorporated by reference in its entirety. In addition, this application claims priority from Korean application number 10-2019-0170355, filed on Dec. 19, 2019, which is hereby incorporated by reference in its entirety.

TECHNICAL FIELD

The present disclosure relates to a method, apparatus, and system for protecting private information from illegal photography by an unmanned aerial vehicle.

BACKGROUND ART

Generally, unmanned aerial vehicles, or called drones, refer to airplane- or helicopter-shaped flying objects that fly by being induced by wireless waves without a person on board. Drones have been recently used in various industrial fields. In early stage of commercialization, drones have been mainly used for military and leisure purposes, but recently, the scope of application thereof has widened to transportation, movies, and broadcasting. Also, aerial vehicles having various sizes and performances have actively developed depending on the purpose of use. In particular, Drones are sometimes deployed and operated in areas inaccessible to humans, such as jungles, remote areas, volcanic areas, natural disaster areas, nuclear power plant accident areas, and the like.

Furthermore, drones can move freely and quickly along a preset path and remotely monitor a specific area through a camera or a sensor mounted thereon. Drones can monitor a specific area by performing functions, such as flight and photography according to a command transmitted from a control device. Here, the control of a drone through a control device can be made in a short-range of several hundred meters or even in an invisible area using LTE communication and the like.

As such, drones have advantages of quickly performing a task that cannot be done directly by humans or is difficult to be done by humans.

Recently, as concerns about personal privacy protection and the use of private information are on the rise, and in a situation where the need to comply with private information protection laws, for example, the European Union's general data protection regulation (GDPR), is emphasized, or legislation to strengthen personal privacy protection related to aerial photography by an unmanned aerial vehicle is promoted in each country, emerging is the need to standardize the protection of private information in connection with image and video data collected through aerial photography by an unmanned aerial vehicle such as drones.

However, there is a problem in that pilots illegally take photos or videos of restricted facilities by flying a drone without permission in areas related to or adjacent to facilities where photography is restricted, such as national security facilities, power plants, and military facilities. Such a problem is gradually increasing as numerous drones are operated indiscriminately by many pilots.

In particular, as a pilot flies a drone over areas related to privacy facilities that require personal privacy protection, such as houses, swimming pools, and hotels, or an area adjacent thereto, without personal consent, there is also a problem of illegally taking photos or videos for subjects that require private information protection. This problem is also gradually increasing as many drones are operated indiscriminately by many pilots.

Furthermore, with the advent of drones with high performance video camera (4K, 8K, etc.), a possibility of private information infringement by drones due to low altitude (the flight altitude of a drone is regulated to be within 120 m to 150 m in most countries) aerial photography has rapidly increased.

To address the above problem, it may be considered to adopt a system of introducing a drone pilot license system to allow only one who owns a drone pilot license to pilot a drone, and of monitoring, controlling, and managing the drone pilot history of a drone pilot license owner. However, such a solution has an aspect of being difficult to prevent illegal photography by a drone license owner, private information infringement according thereto, and the like. Thus, it is difficult to fundamentally prevent illegal photography by a drone, private information infringement according thereto, and the like.

Furthermore, to address the above problem, it may be also considered to adopt a system of transmitting an image captured by a drone with photography information and flight information to the subject of private information protection having a possibility of private information infringement so that the subject of private information protection can delete or mask the capture image to achieve private information protection. However, as such a system is only to provide the subject having a possible private information infringement by an image captured by a drone with an opportunity to process private information protection afterwards, the system has a problem with certain limitations in taking action to protect private information before the drone captures an image.

Accordingly, there is a demand for a method, apparatus, and system to fundamentally protect private information of individuals, organizations, or countries from illegal photography by drones and simultaneously promote legal photography by drones, by taking action to protect private information in advance when unmanned aerial vehicles such as drones capture images.

DESCRIPTION OF EMBODIMENTS

Technical Problem

Provided are a method, apparatus, and system for protecting private information from illegal photography by an unmanned aerial vehicle, in which, when an unmanned aerial vehicle captures an image, by taking action to protect private information in advance, legal photography by the unmanned aerial vehicle is induced, and simultaneously, illegal photography by the unmanned aerial vehicle is fundamentally prevented, so that private information can be strongly protected from the illegal photography by the unmanned aerial vehicle.

Furthermore, provided are a method, apparatus, and system for protecting private information from illegal photography by an unmanned aerial vehicle, in which, when an unmanned aerial vehicle captures an image, by enabling checking whether action to protect private information is taken in advance and action to protect private information is taken afterwards, legal photography by the unmanned aerial vehicle is induced, and simultaneously, illegal photography by the unmanned aerial vehicle is fundamentally prevented, so that private information can be more strongly protected from the illegal photography by the unmanned aerial vehicle by checking whether the action to protect private information protection is taken afterwards.

Furthermore, provided are a method, apparatus, and system for protecting private information from illegal photography by an unmanned aerial vehicle, in which, when an unmanned aerial vehicle captures an image, by establishing a standard process to take action to protect private information in advance, legal photography by the unmanned aerial vehicle is induced, and simultaneously, illegal photography by the unmanned aerial vehicle is fundamentally prevented, so that private information is systematically protected from the illegal photography by the unmanned aerial vehicle, and private information protection principles, such as information protection laws of each country for private information protection, consent to private information collection and rights to be forgotten of the Europe's general data protection regulation (GDPR), and the like, are conformed to.

The technical objectives to be achieved by the disclosure are not limited to the above-described objectives, and other technical objectives that are not mentioned herein would be clearly understood by a person skilled in the art from the description of the present invention.

Solution to Problem

According to an embodiment of the present disclosure, a method of protecting private information from illegal photography by an unmanned aerial vehicle includes receiving information about an area to capture, from an unmanned aerial vehicle or an unmanned aerial vehicle pilot, in advance, by wired or wireless communication, transmitting the information about an area to capture, to a private information protection subject who wants to protect private information about the area to capture, by wired or wireless communication, receiving information about a first action to protect private information accompanying image capturing, from the private information protection subject, by wired or wireless communication, and transmitting the information about a first action to protect private information, the information being received from the private information protection subject, to the unmanned aerial vehicle or the unmanned aerial vehicle pilot who is going to capture an image, by wired or wireless communication.

In an embodiment, the information about an area to capture may include at least one selected from the group consisting of items related to private information generated by image capturing, information related to the unmanned aerial vehicle and the unmanned aerial vehicle pilot and information related to the flight area of the unmanned aerial vehicle.

In an embodiment, the receiving of the information about an area to capture, from the unmanned aerial vehicle or the unmanned aerial vehicle pilot, in advance, by wired or wireless communication, may further include storing in a memory device the information about an area to capture received in advance from the unmanned aerial vehicle or the unmanned aerial vehicle pilot.

In an embodiment, the private information protection subject may include an individual, an organization, or a national organization who is vulnerable to private information infringement due to image capturing by the unmanned aerial vehicle flying over a flight area.

In an embodiment, the information about a first action to protect private information may include at least any one selected from the group consisting of consent or non-consent to image capturing, a certain request for private information protection action, and non-response.

In an embodiment, the method may further include receiving an image captured based on the information about a first action to protect private information, from the unmanned aerial vehicle or the unmanned aerial vehicle pilot, by wired or wireless communication.

In an embodiment, the method may further include transmitting the image captured based on the information about a first action to protect private information, to the private information protection subject, by wired or wireless communication.

In an embodiment, with the image captured based on the information about a first action to protect private information, a report on a result of the first action to protect private information may be transmitted to the private information protection subject, by wired or wireless communication.

In an embodiment, the method may further include receiving information about a second action to protect private information with respect to the image captured based on the information about a first action to protect private information, from the private information protection subject, by wired or wireless communication.

In an embodiment, information about a second action to protect private information with respect to the captured image may include at least any one selected from the group consisting of consent or non-consent to the captured image, a certain additional request for private information protection action, and non-response.

In an embodiment, the method may further include taking a second action to protect private information with respect to the image captured based on the information about a first action to protect private information and received from the private information protection subject.

In an embodiment, the method may further include transmitting an image obtained by taking the second action to protect private information with respect to the image captured based on the information about a first action to protect private information, to the unmanned aerial vehicle or the unmanned aerial vehicle pilot, by wired or wireless communication.

According to another embodiment of the present disclosure, an apparatus for protecting private information from illegal photography by an unmanned aerial vehicle includes an image capturing area information collector configured to receive information about an area to capture, from an unmanned aerial vehicle or an unmanned aerial vehicle pilot, in advance, by wired or wireless communication, an image capturing area information transmitter configured to transmit the information about an area to capture, to a private information protection subject who wants to protect private information about the area to capture, by wired or wireless communication, an image capturing consent information collector configured to receive information about a first action to protect private information accompanying image capturing, from the private information protection subject, by wired or wireless communication, and an image capturing consent information transmitter configured to transmit the information about a first action to protect private information, the information being received from the private information protection subject, to the unmanned aerial vehicle or the unmanned aerial vehicle pilot who is going to capture an image, by wired or wireless communication.

In an embodiment, the information about an area to capture received by the image capturing area information collector may include at least one selected from the group consisting of items related to private information generated by image capturing, information related to the unmanned aerial vehicle and the unmanned aerial vehicle pilot, and information related to a flight area of then unmanned aerial vehicle.

In an embodiment, the private information protection subject to which the image capturing area information transmitter may transmit the information about an area to capture may include an individual, an organization, or a national organization who is vulnerable to private information infringement due to image capturing by the unmanned aerial vehicle flying over a flight area.

In an embodiment, the information about a first action to protect private information received by the image capturing consent information collector may include at least any one selected from the group consisting of consent or non-consent to image capturing, a certain request for private information protection action, and non-response.

In an embodiment, the apparatus may further include a memory portion configured to receive, from the image capturing area information collector, and store the information about an area to capture from the unmanned aerial vehicle or the unmanned aerial vehicle pilot, and receive, from the image capturing consent information collector, and store information about a first action to protect private information from the private information protection subject.

In an embodiment, the apparatus may further include a controller configured to control the image capturing area information collector, the image capturing area information transmitter, the image capturing consent information collector, and the image capturing consent information transmitter.

In an embodiment, the image capturing area information collector may be further configured to receive the image captured based on the information about a first action to protect private information, from the unmanned aerial vehicle or the unmanned aerial vehicle pilot, by wired or wireless communication.

In an embodiment, the image capturing area information transmitter may be further configured to transmit the image captured based on the information about a first action to protect private information, to the private information protection subject, by wired or wireless communication.

In an embodiment, the image capturing area information transmitter may be configured to transmit a report on a result of the first action to protect private information with the image captured based on the information about a first action to protect private information, to the private information protection subject, by wired or wireless communication.

In an embodiment, the image capturing consent information collector may be configured to receive information about a second action to protect private information with respect to the image captured based on the information about a first action to protect private information, from the private information protection subject, by wired or wireless communication.

In an embodiment, the information about a second action to protect private information with respect to the captured image that the image capturing consent information collector receives may include at least any one selected from the group consisting of consent or non-consent to the captured image, a certain additional request for private information protection action, and non-response.

In an embodiment, the controller may be further configured to take a second action to protect private information with respect to the image captured based on the information about a first action to protect private information and received from the private information protection subject.

In an embodiment, the image capturing consent information transmitter may be further configured to transmit an image obtained by taking the second action to protect private information with respect to the image captured based on the information about a first action to protect private information, to the unmanned aerial vehicle or the unmanned aerial vehicle pilot, by wired or wireless communication.

According to another embodiment of the present disclosure, a system for protecting private information from illegal photography by an unmanned aerial vehicle includes an unmanned aerial vehicle or an unmanned aerial vehicle pilot configured to transmit information about an area to capture, in advance, by wired or wireless communication, and receive information about a first action to protect private information accompanying image capturing with respect to the area to capture, by wired or wireless communication, a private information protection subject who wants to protect private information about the area to capture configured to receive information about an area to capture, in advance, by wired or wireless communication, and transmit information about a first action to protect private information, and a private information protection apparatus configured to receive information about an area to capture, from the unmanned aerial vehicle or the unmanned aerial vehicle pilot, in advance, by wired or wireless communication, transmit the information about an area to capture, to the private information protection subject, by wired or wireless communication, receive information about a first action to protect private information, from the private information protection subject, by wired or wireless communication, and transmit the information about a first action to protect private information, the information being received from the private information protection subject, to the unmanned aerial vehicle or the unmanned aerial vehicle pilot who is going to capture an image, by wired or wireless communication.

In an embodiment, the unmanned aerial vehicle or the unmanned aerial vehicle pilot may be further configured to transmit the image captured based on the information about a first action to protect private information image to the private information protection apparatus, by wired or wireless communication.

In an embodiment, the private information protection apparatus may be further configured to transmit the image captured based on the information about a first action to protect private information and received from an unmanned aerial vehicle or an unmanned aerial vehicle pilot, to the private information protection subject, by wired or wireless communication.

In an embodiment, the private information protection subject may be further configured to transmit information about a second action to additionally protect private information with respect to the image captured based on the information about a first action to protect private information, to the private information protection apparatus, by wired or wireless communication.

In an embodiment, the private information protection apparatus may be further configured to take a second action to protect private information with respect to the image captured based on the information about a first action to protect private information.

In an embodiment, the private information protection apparatus may be further configured to transmit an image obtained by taking the second action to protect private information with respect to the image captured based on the information about a first action to protect private information, to the unmanned aerial vehicle or the unmanned aerial vehicle pilot, by wired or wireless communication.

Advantageous Effects of Disclosure

The effects of the present disclosure include a method, apparatus, and system for protecting private information from illegal photography by an unmanned aerial vehicle, in which, when an unmanned aerial vehicle captures an image, by taking action to protect private information in advance, legal photography by the unmanned aerial vehicle is induced, and simultaneously, illegal photography by the unmanned aerial vehicle is fundamentally prevented, so that private information can be strongly protected from the illegal photography by the unmanned aerial vehicle.

The effects of the present disclosure include a method, apparatus, and system for protecting private information from illegal photography by an unmanned aerial vehicle, in which, when an unmanned aerial vehicle captures an image, by enabling checking whether action to protect private information is taken in advance and action to protect private information is taken afterwards, legal photography by the unmanned aerial vehicle is induced, and simultaneously, illegal photography by the unmanned aerial vehicle is fundamentally prevented, so that private information can be more strongly protected from the illegal photography by the unmanned aerial vehicle by checking whether the action to protect private information protection is taken afterwards.

The effects of the present disclosure include a method, apparatus, and system for protecting private information from illegal photography by an unmanned aerial vehicle, in which, when an unmanned aerial vehicle captures an image, by establishing a standard process to take action to protect private information in advance, legal photography by the unmanned aerial vehicle is induced, and simultaneously, illegal photography by the unmanned aerial vehicle is fundamentally prevented, so that private information is systematically protected from the illegal photography by the unmanned aerial vehicle, and private information protection principles, such as information protection laws of each country for private information protection, consent to private information collection and rights to be forgotten of the Europe's general data protection regulation (GDPR), and the like, are conformed to.

The effects of the present disclosure are not limited to the contents disclosed herein, and other various effects that are not mentioned herein would be clearly understood by a person skilled in the art from the description of the present invention.

MODE OF DISCLOSURE

The disclosure will now be described more fully with reference to the accompanying drawings, in which embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Furthermore, terms used in the specification are used for explaining a specific embodiment, not for limiting the disclosure. The expression of singularity in the specification includes the expression of plurality unless clearly specified otherwise in context.

In the present specification, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Embodiment 1

Figure 1:
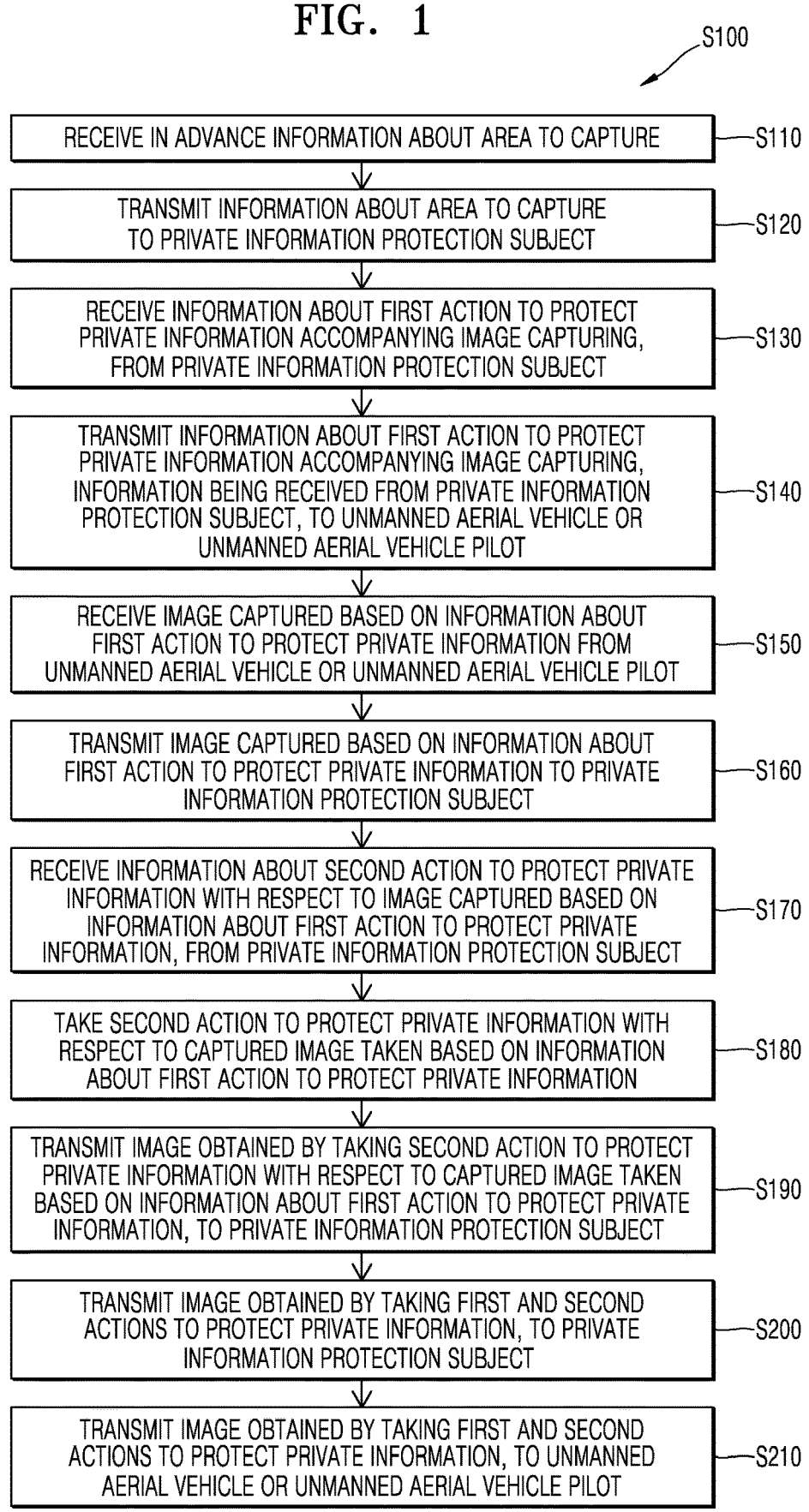
FIG. 1 is a flowchart of a method of protecting private information from illegal photography by an unmanned aerial vehicle according to an embodiment of the present disclosure.

A method (S100) of protecting private information from illegal photography by an unmanned aerial vehicle according to an embodiment of the present disclosure includes, as exemplarily shown in FIG. 1, receiving in advance information about an area to capture from an unmanned aerial vehicle or an unmanned aerial vehicle pilot (S110), transmitting the information about an area to capture, to a private information protection subject who wants to protect private information about the area to capture (S120), receiving information about a first action to protect private information accompanying image capturing, from the private information protection subject (S130), and transmitting the information about a first action to protect private information accompanying image capturing, the information being received from the private information protection subject, to the unmanned aerial vehicle or the unmanned aerial vehicle pilot who wants to capture an image (S140).

The method (S100) of protecting private information from illegal photography by an unmanned aerial vehicle according to the present embodiment may include a method performed by various apparatuses or systems. For example, the method (S100) of protecting private information from illegal photography by an unmanned aerial vehicle according to the present embodiment may be a method performed by the apparatus 100 for protecting private information from illegal photography by an unmanned aerial vehicle according to an embodiment, which is described below.

The receiving in advance of information about an area to capture from an unmanned aerial vehicle or an unmanned aerial vehicle pilot (S110) may include receiving information about an area to capture by wired or wireless communication in advance before image capturing by an unmanned aerial vehicle from the unmanned aerial vehicle or an unmanned aerial vehicle pilot. Accordingly, the information about an area to capture may be checked in advance before image capturing by an unmanned aerial vehicle, and based on the information, a private information protection subject who wants to protect private information about the area to capture may be able to take a private information protection action in advance before image capturing by the unmanned aerial vehicle, so that legal photography by the unmanned aerial vehicle may be induced, and simultaneously, private information may be fundamentally protected from illegal photography by the unmanned aerial vehicle.

Here, the information about an area to capture may include at least one selected from the group consisting of items related to private information generated by image capturing, information related to an unmanned aerial vehicle and an unmanned aerial vehicle pilot, and information related to the flight area of an unmanned aerial vehicle. The items related to private information generated by image capturing may include a capturing area, a time, a purpose, a disclosure status, an image storage period, a photographer, capturing quality, etc. The information about an unmanned aerial vehicle and a pilot of the unmanned aerial vehicle may include information about the type, performance, speed, etc. of an unmanned aerial vehicle, and a main pilot, a remote pilot, a ground control personnel, etc. of an unmanned aerial vehicle. The information related to the flight area of an unmanned aerial vehicle may include a flight path, a flight time, a flight altitude, a flight location, etc.

Here, the wired or wireless communication may include the wired or wireless Internet, a wired aerial network, a wireless mobile communication network, or a core network integrated with the mobile Internet, etc. The wireless communication may include a satellite communication, but the disclosure is not limited thereto. For example, the wireless communication may be configured to perform communication by a communication method selected from the group consisting of LAN, MAN (Metropolitan Area Network), GSM (Global System for Mobile Network), EDGE (Enhanced Data GSM Environment), HSDPA (High Speed Downlink Packet Access), W-CDMA (Wideband Code Division Multiple Access), CDMA (Code Division Multiple Access), TDMA (Time Division Multiple Access), Bluetooth, Zigbee, VoIP (Voice over Internet Protocol), LTE Advanced, IEEE80216m, wireless MAN-Advanced, HSPA+, 3GPP Long Term Evolution (LTE), Mobile WiMAX (IEEE 80216e), UMB (formerly EV-DO RevC), Flash-OFDM, iBurst and MBWA (IEEE 80220) systems, HIPERMAN, Beam-Division Multiple Access (BDMA), Wi-MAX (World Interoperability for Microwave Access) and communication using ultrasound.

The receiving in advance of information about an area to capture from an unmanned aerial vehicle or an unmanned aerial vehicle pilot (S110) may further include storing, in a memory device, the information about an area to capture received in advance from an unmanned aerial vehicle or an unmanned aerial vehicle pilot. Accordingly, it may be easily checked whether the image capturing made by an unmanned aerial vehicle is achieved according to the information, based on the information about an area to capture received and stored in advance from the unmanned aerial vehicle or the unmanned aerial vehicle pilot.

The transmitting of the information about an area to capture, to a private information protection subject who wants to protect private information about the area to capture (S120) may include transmitting the information about an area to capture received in advance from an unmanned aerial vehicle or an unmanned aerial vehicle pilot to the private information protection subject, by wired or wireless communication. Accordingly, by notifying the private information protection subject who wants to protect private information about the area to capture of the information about an area to capture in advance before image capturing by an unmanned aerial vehicle, so as to enable the private information protection subject to take a private information protection action, legal photography by the unmanned aerial vehicle may be induced, and simultaneously, private information may be fundamentally protected from illegal photography by the unmanned aerial vehicle.

Here, the private information protection subject who wants to protect private information about the area to capture may include an individual, an organization, or a national organization who is vulnerable to private information infringement due to image capturing by an unmanned aerial vehicle flying over a flight area. For example, the private information protection subject who wants to protect private information about the area to capture may mean an individual, an organization, or a national organization who is vulnerable to private information infringement because an image is captured in an area where an unmanned aerial vehicle captures an image while flying over a flight area, that is, not only in the flight area of an unmanned aerial vehicle, but also in an area where an image is captured by an unmanned aerial vehicle flying over the flight area.

The transmitting of the information about an area to capture to the private information protection subject who wants to protect private information about the area to capture may be performed through a terminal of the private information protection subject. Here, the terminal of the private information protection subject may include mobile terminals, such as a cellular phone, a personal communications services phone (PCS phone), synchronous/asynchronous IMT-2000 (International Mobile Telecommunication-2000), and the like, which communicates via the wireless Internet or the mobile Internet. In addition, the terminal of the private information protection subject may include all wired/wireless home appliances/communication apparatuses having an interface to access a webserver, such as a palm personal computer (Palm PC), a personal digital assistant (PDA), a smartphone, a wireless application protocol phone (WAP phone), a mobile game console (mobile playstation), a PDA phone or a digital multimedia broadcasting (DMB) phone with a communication function, a tablet PC, an iPad, and the like.

The receiving of information about a first action to protect private information accompanying image capturing, from the private information protection subject (S130) may include receiving the information about a first action to protect private information accompanying image capturing, by wired or wireless communication, from the private information protection subject who is vulnerable to private information infringement due to the information about an area to capture. Accordingly, by receiving the information about a first action to protect private information from the private information protection subject in advance before image capturing by an unmanned aerial vehicle and transmitting the information to the unmanned aerial vehicle or the unmanned aerial vehicle pilot, legal photography by the unmanned aerial vehicle may be induced, and simultaneously, private information may be fundamentally protected from illegal photography by the unmanned aerial vehicle.

Here, the information about a first action to protect private information accompanying image capturing may include comprehensive action, such as consent or non-consent to image capturing, a request for private information protection action, non-response, etc. For example, the consent to image capturing may mean consent to capturing an image without action to protect private information, and the non-consent to image capturing may mean non-consent to capturing an area where private information infringement may occur to a private information protection subject. Furthermore, the request for private information protection action to image capturing may mean that while image capturing is consented, taking additional action to protect private information, such as masking, mosaic processing, blurring, etc., is requested to a portion of a captured image which is vulnerable to private information infringement, and the non-response to image capturing may mean that there is no response to capturing an image.

The transmitting of the information about a first action to protect private information accompanying image capturing, the information being received from the private information protection subject, to the unmanned aerial vehicle or the unmanned aerial vehicle pilot who wants to capture an image (S140) includes transmitting the information about a first action to protect private information accompanying image capturing received from the private information protection subject to the unmanned aerial vehicle or the unmanned aerial vehicle pilot who is going to capture an image, by wired or wireless communication. Accordingly, by transmitting the information about a first action to protect private information accompanying image capturing to the unmanned aerial vehicle or the unmanned aerial vehicle pilot who is going to capture an image, the unmanned aerial vehicle or the unmanned aerial vehicle pilot is induced to capture an image in a state in which the first action to protect private information is accompanied, and thus, legal photography by the unmanned aerial vehicle may be induced, and simultaneously, private information may be fundamentally protected from illegal photography by the unmanned aerial vehicle.

Here, the information about a first action to protect private information accompanying image capturing may include, as described above, comprehensive action, such as consent or non-consent to image capturing, a certain request for private information protection action, non-response, etc.

Meanwhile, the method (S100) of protecting private information from illegal photography by an unmanned aerial vehicle according to the present embodiment may further include receiving an image captured based on the information about a first action to protect private information accompanying image capturing from the unmanned aerial vehicle or the unmanned aerial vehicle pilot by wired or wireless communication (S150). As such, as the captured image is taken based on the information about a first action to protect private information of the private information protection subject, the captured image may be a legal image having no possibility of private information infringement, and thus, the private information of the private information protection subject may be sufficiently protected.

Furthermore, the method (S100) of protecting private information from illegal photography by an unmanned aerial vehicle according to the present embodiment may further include transmitting the image captured based on the information about a first action to protect private information accompanying image capturing to the private information protection subject, by wired or wireless communication (S160). Accordingly, the private information protection subject may check whether the captured image has been appropriately captured according to the first action, based on the information about a first action to protect private information.

Here, with the image captured based on the information about a first action to protect private information accompanying image capturing, a report on a result of the first action to protect private information may be transmitted to the private information protection subject, by wired or wireless communication. Accordingly, the private information protection subject may easily check, through the report, whether the captured image has been appropriately captured according to the first action, based on the information about a first action to protect private information, and may easily check whether the first action has actually been taken in the captured image, based on the report.

The method (S100) of protecting private information from illegal photography by an unmanned aerial vehicle according to the present embodiment may further include receiving information about a second action to protect private information with respect to the image captured based on the information about a first action to protect private information accompanying image capturing, from the private information protection subject, by wired or wireless communication (S170). Accordingly, the private information protection subject may request a second action to additionally protect private information on the captured image, as necessary, after checking the image captured based on the information about a first action to protect private information, so that the private information may be further completely protected from illegal photography by an unmanned aerial vehicle.

The private information protection subject may request a second action to additionally protect private information with respect to the captured image as necessary, for example, when no information about a first action to protect private information has been transmitted in advance before image capturing by an unmanned aerial vehicle, there may be a need to request a second action to protect private information afterwards with respect to the captured image, even when the information about a first action to protect private information has been transmitted in advance before image capturing by an unmanned aerial vehicle, there may be a need to request an additional action to additionally protect private information, or the like. The receiving of the information about a second action to protect private information by wired or wireless communication (S170) may provide the private information protection subject with an opportunity to request a second action to additionally protect private information afterwards.

Here, the information about a second action to protect private information with respect to the captured image may include, similar to the information about a first action to protect private information, may include at least one selected from the group consisting of consent or non-consent to the captured image, a certain additional request for private information protection action, and non-response.

The method (S100) of protecting private information from illegal photography by an unmanned aerial vehicle according to the present embodiment may further include taking a second action to protect private information with respect to the image captured based on the information about a first action to protect private information and received from the private information protection subject (S180). Accordingly, by directly processing the second action to protect private information, not entrusting the action to the unmanned aerial vehicle or the unmanned aerial vehicle pilot, the second action to protect private information may be quickly taken. However, the method (S100) of protecting private information from illegal photography by an unmanned aerial vehicle according to the present embodiment is not necessarily limited thereto, and by transmitting the information about a second action to protect private information to the unmanned aerial vehicle or the unmanned aerial vehicle pilot, the unmanned aerial vehicle, etc. may take the second action.

The method (S100) of protecting private information from illegal photography by an unmanned aerial vehicle according to the present embodiment may further include transmitting an image obtained by taking the second action to protect private information with respect to the image captured based on the information about a first action to protect private information, to the private information protection subject, by wired or wireless communication (S190). Accordingly, the private information protection subject may check whether the second action has been appropriately taken after checking the image on which the second action to protect private information is taken, and thus, private information may be further completely protected from illegal photography by an unmanned aerial vehicle.

The method (S100) of protecting private information from illegal photography by an unmanned aerial vehicle according to the present embodiment may further include transmitting an image obtained by taking the second action to protect private information with respect to the image captured based on the information about a first action to protect private information, to the private information protection subject (S200). Accordingly, the private information protection subject may check whether the second action has been appropriately taken after checking the image on which the second action to protect private information is taken, and thus, private information may be further completely protected from illegal photography by an unmanned aerial vehicle.

Additionally, the method (S100) of protecting private information from illegal photography by an unmanned aerial vehicle according to the present embodiment may further include transmitting an image obtained by taking the second action to protect private information with respect to the image captured based on the information about a first action to protect private information, to the unmanned aerial vehicle or the unmanned aerial vehicle pilot (S210). Accordingly, the unmanned aerial vehicle or the unmanned aerial vehicle pilot may legally use an image on which first and second actions to protect private information are taken, according to the purpose of photography.

Meanwhile, in relation with the method (S100) of protecting private information from illegal photography by an unmanned aerial vehicle according to the present embodiment, during an image capturing process in an area to capture an image, the unmanned aerial vehicle or the unmanned aerial vehicle pilot may transmit information about an area to capture directly to the private information protection subject who did not respond in advance, to the first action to protect private information accompanying image capturing, among private information protection subjects, and may receive the first action to protect private information accompanying image capturing, from the private information protection subject.

Embodiment 2

Figure 2:
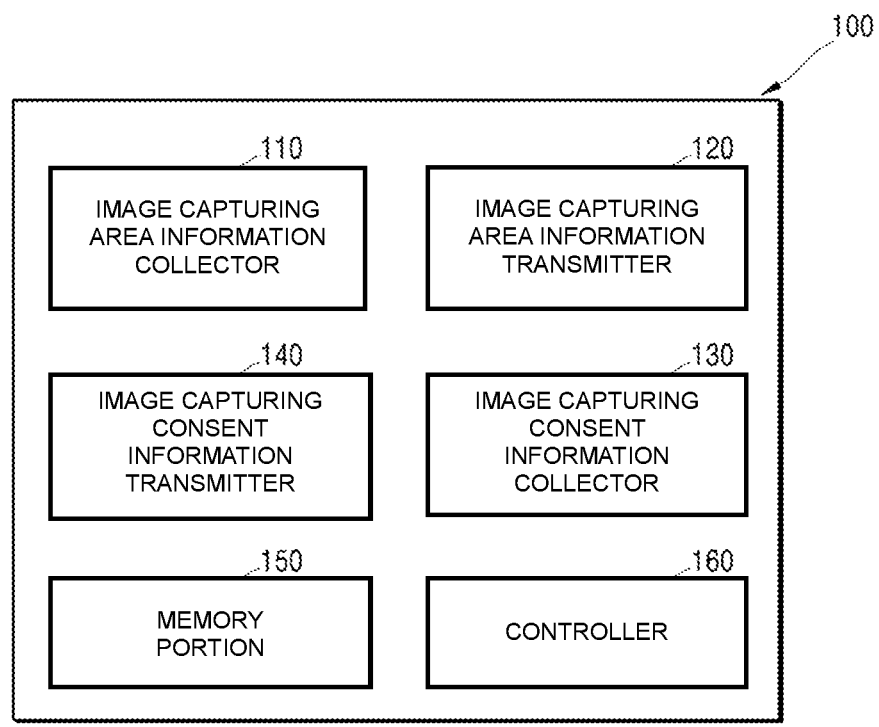
FIG. 2 is a block diagram of an apparatus for protecting private information from illegal photography by an unmanned aerial vehicle, according to another embodiment of the present disclosure.

The apparatus 100 for protecting private information from illegal photography by an unmanned aerial vehicle according to an embodiment of the present disclosure, as exemplarily shown in FIG. 2, includes an image capturing area information collector 110, an image capturing area information transmitter 120, an image capturing consent information collector 130, and an image capturing consent information transmitter 140. In addition, the apparatus 100 for protecting private information from illegal photography by an unmanned aerial vehicle, according to the present embodiment may further include a memory portion 150 and a controller 160.

The image capturing area information collector 110 receives information about an area to capture from an unmanned aerial vehicle or an unmanned aerial vehicle pilot in advance, that is, receives information about an area to capture, from an unmanned aerial vehicle or an unmanned aerial vehicle pilot, in advance, by wired or wireless communication. Accordingly, the information about an area to capture may be checked in advance before image capturing by an unmanned aerial vehicle, and based on the information, a private information protection subject who wants to protect private information about the area to capture may be able to take a private information protection action in advance before image capturing by the unmanned aerial vehicle, so that legal photography by the unmanned aerial vehicle may be induced, and simultaneously, private information may be fundamentally protected from illegal photography by the unmanned aerial vehicle.

Here, the information about an area to capture may include at least one selected from the group consisting of items related to private information generated by image capturing, information related to an unmanned aerial vehicle and an unmanned aerial vehicle pilot, and information related to the flight area of an unmanned aerial vehicle. The items related to private information generated by image capturing may include a capturing area, a time, a purpose, a disclosure status, an image storage period, a photographer, capturing quality, etc. Furthermore, the information about an unmanned aerial vehicle and a pilot of the unmanned aerial vehicle may include information about the type, performance, speed, etc. of an unmanned aerial vehicle, and a main pilot, a remote pilot, a ground control personnel, etc. of an unmanned aerial vehicle. The information related to the flight area of an unmanned aerial vehicle may include a flight path, a flight time, a flight altitude, a flight location, etc.

Here, the wired or wireless communication may include the wired or wireless Internet, a wired aerial network, a wireless mobile communication network, or a core network integrated with the mobile Internet, etc. The wireless communication may include a satellite communication, but the disclosure is not limited thereto. For example, the wireless communication may be configured to perform communication by a communication method selected from the group consisting of LAN, MAN (Metropolitan Area Network), GSM (Global System for Mobile Network), EDGE (Enhanced Data GSM Environment), HSDPA (High Speed Downlink Packet Access), W-CDMA (Wideband Code Division Multiple Access), CDMA (Code Division Multiple Access), TDMA (Time Division Multiple Access), Bluetooth, Zigbee, VoIP (Voice over Internet Protocol), LTE Advanced, IEEE80216m, wireless MAN-Advanced, HSPA+, 3GPP Long Term Evolution (LTE), Mobile WiMAX (IEEE 80216e), UMB (formerly EV-DO RevC), Flash-OFDM, iBurst and MBWA (IEEE 80220) systems, HIPERMAN, Beam-Division Multiple Access (BDMA), Wi-MAX (World Interoperability for Microwave Access) and communication using ultrasound.

The receiving in advance of information about an area to capture from an unmanned aerial vehicle or an unmanned aerial vehicle pilot (S110) may further include the memory portion for storing the information about an area to capture received in advance from an unmanned aerial vehicle or an unmanned aerial vehicle pilot. Accordingly, it may be easily checked whether the image capturing made by an unmanned aerial vehicle is achieved according to the information, based on the information about an area to capture received and stored in advance from the unmanned aerial vehicle or the unmanned aerial vehicle pilot.

The image capturing area information transmitter 120 transmits information about an area to capture to a private information protection subject who wants to protect private information about the area to capture, that is, transmits the information about an area to capture received in advance from an unmanned aerial vehicle or an unmanned aerial vehicle pilot, to the private information protection subject, by wired or wireless communication. Accordingly, by notifying the private information protection subject of the information about an area to capture in advance before image capturing by an unmanned aerial vehicle, so as to enable the private information protection subject to take a private information protection action, legal photography by the unmanned aerial vehicle may be induced, and simultaneously, private information may be fundamentally protected from illegal photography by the unmanned aerial vehicle.

Here, the private information protection subject who wants to protect private information about the area to capture may include an individual, an organization, or a national organization who is vulnerable to private information infringement due to image capturing by an unmanned aerial vehicle flying over a flight area. For example, the private information protection subject who wants to protect private information about the area to capture may mean an individual, an organization, or a national organization who is vulnerable to private information infringement because an image is captured in an area where an unmanned aerial vehicle captures an image while flying over a flight area, that is, not only in the flight area of an unmanned aerial vehicle, but also in an area where an image is captured by an unmanned aerial vehicle flying over the flight area.

The transmitting of the information about an area to capture to the private information protection subject who wants to protect private information about the area to capture may be performed through a terminal of the private information protection subject. Here, the terminal of the private information protection subject may include mobile terminals, such as a cellular phone, a personal communications services phone (PCS phone), synchronous/asynchronous IMT-2000 (International Mobile Telecommunication-2000), and the like, which communicates via the wireless Internet or the mobile Internet. In addition, the terminal of the private information protection subject may include all wired/wireless home appliances/communication apparatuses having an interface to access a webserver, such as a palm personal computer (Palm PC), a personal digital assistant (PDA), a smartphone, a wireless application protocol phone (WAP phone), a mobile game console (mobile playstation), a PDA phone or a digital multimedia broadcasting (DMB) phone with a communication function, a tablet PC, an iPad, and the like.

The image capturing consent information collector 130 receives information about a first action to protect private information accompanying image capturing from the private information protection subject, that is, receives information about a first action to protect private information, from the private information protection subject, by wired or wireless communication. Accordingly, by receiving the information about a first action to protect private information from the private information protection subject in advance before image capturing by an unmanned aerial vehicle, and transmitting the received information to the unmanned aerial vehicle or the unmanned aerial vehicle pilot, legal photography by the unmanned aerial vehicle may be induced, and simultaneously, private information may be fundamentally protected from illegal photography by the unmanned aerial vehicle.

Here, the information about a first action to protect private information may include comprehensive action, such as consent or non-consent to image capturing, a certain request for private information protection action, non-response, etc. For example, the consent to image capturing may mean consent to capturing an image without action to protect private information, and the non-consent to image capturing may mean non-consent to capturing an area where private information infringement may occur to a private information protection subject. Furthermore, the request for private information protection action to image capturing may mean that while image capturing is consented, taking additional action to protect private information, such as masking, mosaic pro cessing, blurring, etc., is requested to a portion of a captured image which is vulnerable to private information infringement, and the non-response to image capturing may mean that there is no response to capturing an image.

The image capturing consent information transmitter 140 transmits the information about a first action to protect private information accompanying image capturing received from the private information protection subject, to the unmanned aerial vehicle or the unmanned aerial vehicle pilot who is going to capture an image, that is, transmits the information about a first action to protect private information, the information being received from the private information protection subject, to the unmanned aerial vehicle or the unmanned aerial vehicle pilot who is going to capture an image, by wired or wireless communication. Accordingly, by transmitting the information about a first action to protect private information to the unmanned aerial vehicle or the unmanned aerial vehicle pilot who is going to capture an image, the unmanned aerial vehicle or the unmanned aerial vehicle pilot is induced to capture an image in a state in which the first action to protect private information is accompanied, and thus, legal photography by the unmanned aerial vehicle may be induced, and simultaneously, private information may be fundamentally protected from illegal photography by the unmanned aerial vehicle.

Here, the information about a first action to protect private information may include, as described above, comprehensive action, such as consent or non-consent to image capturing, a certain request for private information protection action, non-response, etc.

The apparatus 100 for protecting private information from illegal photography by an unmanned aerial vehicle, according to the present embodiment may further include the memory portion 150 for receiving and storing the information about an area to capture from the unmanned aerial vehicle or the unmanned aerial vehicle pilot, from the image capturing area information collector 110, and receiving and storing the information about a first action to protect private information from the private information protection subject, from the image capturing consent information collector 130.

Furthermore, the apparatus 100 for protecting private information from illegal photography by an unmanned aerial vehicle, according to the present embodiment may further include the controller 160 for controlling the image capturing area information collector 110, the image capturing area information transmitter 120, the image capturing consent information collector 130, and the image capturing consent information transmitter 140.

Meanwhile, the image capturing area information collector 110 may receive a captured image taken based on the information about a first action to protect private information, from the unmanned aerial vehicle or the unmanned aerial vehicle pilot, by wired or wireless communication. As such, as the captured image is taken based on the information about a first action to protect private information of the private information protection subject, the captured image may be a legal image having no possibility of private information infringement, and thus, the private information of the private information protection subject may be sufficiently protected.

Furthermore, the image capturing area information transmitter 120 may transmit the image captured based on the information about a first action to protect private information, to the private information protection subject, by wired or wireless communication. Accordingly, the private information protection subject may check whether the captured image has been appropriately captured according to the first action, based on the information about a first action to protect private information.

Here, the image capturing area information transmitter 120 may transmit a report on a result of the first action to protect private information to the private information protection subject, with the image captured based on the information about a first action to protect private information, by wired or wireless communication. Accordingly, the private information protection subject may easily check, through the report, whether the captured image has been appropriately captured according to the first action, based on the information about a first action to protect private information, and may easily check whether the first action has actually been taken in the captured image, based on the report.

The image capturing consent information collector 130 may receive information about a second action to protect private information with respect to the image captured based on the information about a first action to protect private information, from the private information protection subject, by wired or wireless communication. Accordingly, the private information protection subject may request a second action to additionally protect private information on the captured image, as necessary, after checking the image captured based on the information about a first action to protect private information, so that the private information may be further completely protected from illegal photography by an unmanned aerial vehicle.

The private information protection subject may request a second action to additionally protect private information with respect to the captured image as necessary, for example, when no information about a first action to protect private information has been transmitted in advance before image capturing by an unmanned aerial vehicle, there may be a need to request a second action to protect private information afterwards with respect to the captured image, even when the information about a first action to protect private information has been transmitted in advance before image capturing by an unmanned aerial vehicle, there may be a need to request an additional action to additionally protect private information, or the like. The receiving by the image capturing consent information collector 130 of the information about a second action to protect private information by wired or wireless communication may provide an opportunity to the private information protection subject who wants to request a second action to additionally protect private information afterwards.

Here, the information about a second action to protect private information, similar to the information about a first action to protect private information, may include at least one selected from the group consisting of consent or non-consent to the captured image, a certain additional request for private information protection action, and non-response.

The controller 160 may take a second action to protect private information with respect to the image captured based on the information about a first action to protect private information and received from the private information protection subject. Accordingly, by directly processing the second action to protect private information, not entrusting the action to the unmanned aerial vehicle or the unmanned aerial vehicle pilot, the second action to protect private information may be quickly taken. However, the apparatus 100 for protecting private information from illegal photography by an unmanned aerial vehicle, according to the present embodiment is not necessarily limited thereto, and by transmitting the information about a second action to protect private information to the unmanned aerial vehicle or the unmanned aerial vehicle pilot, the unmanned aerial vehicle, etc. may take the second action.

The image capturing consent information transmitter 140 may transmit an image obtained by taking the second action to protect private information with respect to the image captured based on the information about a first action to protect private information, to the private information protection subject, by wired or wireless communication. Accordingly, the private information protection subject may check whether the second action has been appropriately taken after checking the image on which the second action to protect private information is taken, and thus, private information may be further completely protected from illegal photography by an unmanned aerial vehicle.

Additionally, the image capturing consent information transmitter 140 may further include transmitting an image obtained by taking the second action to protect private information with respect to the image captured based on the information about a first action to protect private information, to the unmanned aerial vehicle or the unmanned aerial vehicle pilot. Accordingly, the unmanned aerial vehicle or the unmanned aerial vehicle pilot may legally use an image on which first and second actions to protect private information are taken, according to the purpose of photography.

Meanwhile, without depending on the apparatus 100 for protecting private information from illegal photography by an unmanned aerial vehicle, during an image capturing process in an area to capture an image, the unmanned aerial vehicle or the unmanned aerial vehicle pilot may transmit information about an area to capture directly to the private information protection subject who did not respond in advance, to the first action to protect private information accompanying image capturing, among private information protection subjects, and may receive the first action to protect private information accompanying image capturing, from the private information protection subject.

Embodiment 3

Figure 3:
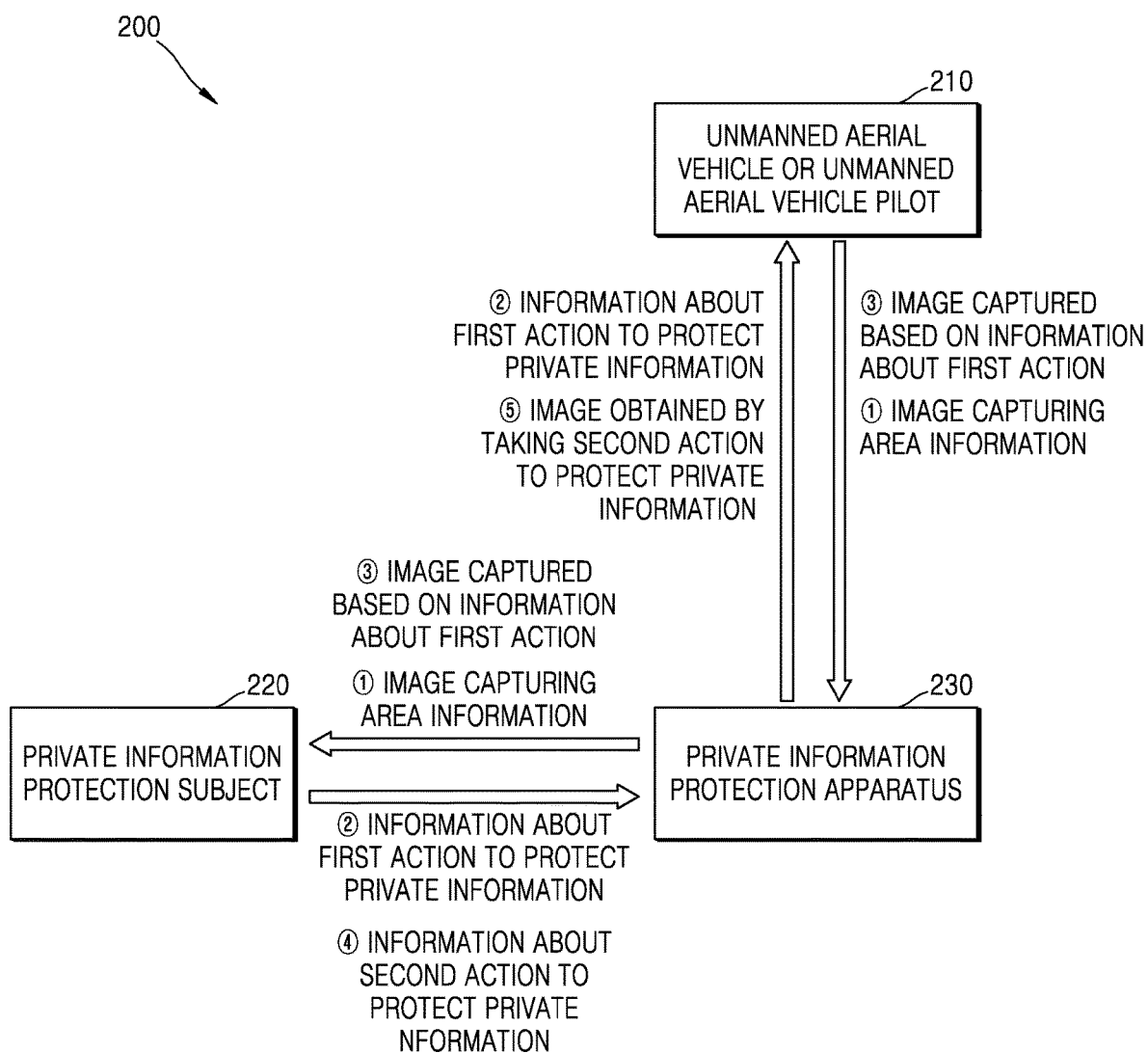
FIG. 3 is a block diagram of a system for protecting private information from illegal photography by an unmanned aerial vehicle according to another embodiment of the present disclosure.

A system 200 for protecting private information from illegal photography by an unmanned aerial vehicle according to another embodiment of the present disclosure, as exemplarily shown in FIG. 3, includes an unmanned aerial vehicle or unmanned aerial vehicle pilot 210, a private information protection subject 220, and a private information protection apparatus 230.

The present embodiment is described mainly for portions that do not overlap Embodiment 1 or Embodiment 2.

The unmanned aerial vehicle or unmanned aerial vehicle pilot 210 transmits information about an area to capture in advance and receives information about a first action to protect private information accompanying image capturing with respect to the area to capture, that is, transmit information about an area to capture, in advance, by wired or wireless communication, and receives information about a first action to protect private information by wired or wireless communication.

The private information protection subject 220 is a subject that receives information about an area to capture, in advance, by wired or wireless communication, transmits information about a first action to protect private information, and protects private information about the area to capture.

The private information protection apparatus 230 receives information about an area to capture, from an unmanned aerial vehicle or an unmanned aerial vehicle pilot, in advance, by wired or wireless communication, transmits the information about an area to capture, to the private information protection subject, by wired or wireless communication, receives information about a first action to protect private information, from the private information protection subject, by wired or wireless communication, and transmits the information about a first action to protect private information, the information being received from the private information protection subject, to the unmanned aerial vehicle or the unmanned aerial vehicle pilot who is going to capture an image, by wired or wireless communication.

The unmanned aerial vehicle or unmanned aerial vehicle pilot 210 may transmit the image captured based on the information about a first action to protect private information image, to the private information protection apparatus 230, by wired or wireless communication. As such, as the transmitted captured image is taken based on the information about a first action to protect private information of the private information protection subject, the captured image may be a legal image having no possibility of private information infringement, and thus, the private information of the private information protection subject may be sufficiently protected.

The private information protection apparatus 230 may transmit the image captured based on the information about a first action to protect private information received from the unmanned aerial vehicle or unmanned aerial vehicle pilot 210, to the private information protection subject 220, by wired or wireless communication. Accordingly, the private information protection subject may check whether the captured image has been appropriately captured according to the first action, based on the information about a first action to protect private information.

The private information protection subject 220 may transmit information about a second action to additionally protect private information with respect to the image captured based on the information about a first action to protect private information, to the private information protection apparatus 230, by wired or wireless communication. Accordingly, the private information protection subject may request a second action to additionally protect private information on the captured image, as necessary, after checking the image captured based on the information about a first action to protect private information, so that the private information may be further completely protected from illegal photography by an unmanned aerial vehicle.

The private information protection apparatus 230 may take a second action to protect private information with respect to the image captured based on the information about a first action to protect private information. Accordingly, by directly processing the second action to protect private information, not entrusting the action to the unmanned aerial vehicle or the unmanned aerial vehicle pilot 210, the second action to protect private information may be quickly taken. However, the disclosure is not necessarily limited thereto, and as the private information protection apparatus 230 transmit the information about a second action to protect private information to the unmanned aerial vehicle or unmanned aerial vehicle pilot 210, the unmanned aerial vehicle, etc. may take the second action.

The private information protection apparatus 230 may transmit an image obtained by taking the second action to protect private information with respect to the image captured based on the information about a first action to protect private information, to the private information protection subject 220, by wired or wireless communication. Accordingly, the private information protection subject 220 checks whether the second action has been appropriately taken after checking the image on which the second action to protect private information is taken, and thus, private information may be further completely protected from illegal photography by an unmanned aerial vehicle.

In addition, the private information protection apparatus 230 may transmit an image obtained by taking the second action to protect private information with respect to the image captured based on the information about a first action to protect private information, to the unmanned aerial vehicle or unmanned aerial vehicle pilot 210, by wired or wireless communication. Accordingly, the unmanned aerial vehicle or unmanned aerial vehicle pilot 210 may legally use the image on which first and second actions to protect private information are taken, according to the purpose of photography.

While the disclosure has been particularly shown and described with reference to preferred embodiments using specific terminologies, the embodiments and terminologies should be considered in descriptive sense only and not for purposes of limitation. Therefore, it will be understood by those of ordinary skill in the art that various changes in form and details may be made therein without departing from the spirit and scope of the disclosure as defined by the following claims.

INDUSTRIAL APPLICABILITY

The present disclosure may be used for a method, apparatus, and system for protecting private information from illegal photography by an unmanned aerial vehicle.

What is claimed:

1. A method of protecting private information from illegal photography by an unmanned aerial vehicle, the method comprising:
   receiving information about an area to capture, from the unmanned aerial vehicle or an unmanned aerial vehicle pilot, in advance, by wired or wireless communication;
   transmitting the information about an area to capture, to a private information protection subject who wants to protect private information about the area to capture, by wired or wireless communication;
   receiving information about a first action to protect private information accompanying image capturing, from the private information protection subject, by wired or wireless communication; and
   transmitting the information about a first action to protect private information, the information being received from the private information protection subject, to the unmanned aerial vehicle or the unmanned aerial vehicle pilot who is going to capture an image, by wired or wireless communication, wherein the method further comprises receiving an image captured based on the information about a first action to protect private information, from the unmanned aerial vehicle or the unmanned aerial vehicle pilot, by wired or wireless communication, wherein the method further comprises transmitting the image captured based on the information about a first action to protect private information, to the private information protection subject, by wired or wireless communication, wherein the method further comprises receiving information about a second action to protect private information with respect to the image captured based on the information about a first action to protect private information, from the private information protection subject, by wired or wireless communication, wherein each of the information about a first action and the information about a second action includes a request for taking action to protect private information to a portion of the captured image which is vulnerable to private information infringement, wherein the information about a first action is transmitted in advance before image capturing by the unmanned aerial vehicle and the information about a second action is transmitted afterwards with respect to the captured image.

2. The method of claim 1, wherein the information about an area to capture comprises at least one selected from the group consisting of items related to private information generated by image capturing, information related to the unmanned aerial vehicle and the unmanned aerial vehicle pilot, and information related to a flight area of the unmanned aerial vehicle.

3. The method of claim 1, wherein the receiving of the information about an area to capture, from the unmanned aerial vehicle or the unmanned aerial vehicle pilot, in advance, by wired or wireless communication, further comprises storing in a memory device the information about an area to capture received in advance from the unmanned aerial vehicle or the unmanned aerial vehicle pilot.

4. The method of claim 1, wherein the private information protection subject comprises an individual, an organization, or a national organization who is vulnerable to private information infringement due to image capturing by the unmanned aerial vehicle flying over a flight area.

5. The method of claim 1, wherein, with the image captured based on the information about a first action to protect private information, a report on a result of the first action to protect private information is transmitted to the private information protection subject, by wired or wireless communication.

6. The method of claim 1, further comprising taking a second action to protect private information with respect to the image captured based on the information about a first action to protect private information and received from the private information protection subject.

7. The method of claim 6, further comprising transmitting an image obtained by taking the second action to protect private information with respect to the image captured based on the information about a first action to protect private information, to the unmanned aerial vehicle or the unmanned aerial vehicle pilot, by wired or wireless communication.

8. An apparatus for protecting private information from illegal photography by an unmanned aerial vehicle, the apparatus comprising:

an image capturing area information collector configured to receive information about an area to capture, from an unmanned aerial vehicle or an unmanned aerial vehicle pilot, in advance, by wired or wireless communication;

an image capturing area information transmitter configured to transmit the information about an area to capture, to a private information protection subject who wants to protect private information about the area to capture, by wired or wireless communication;

an image capturing consent information collector configured to receive information about a first action to protect private information accompanying image capturing, from the private information protection subject, by wired or wireless communication; and an image capturing consent information transmitter configured to transmit the information about a first action to protect private information, the information being received from the private information protection subject, to the unmanned aerial vehicle or the unmanned aerial vehicle pilot who is going to capture an image, by wired or wireless communication, wherein the image capturing area information collector is further configured to receive the image captured based on the information about a first action to protect private information, from the unmanned aerial vehicle or the unmanned aerial vehicle pilot, by wired or wireless communication, wherein the image capturing area information transmitter is further configured to transmit the image captured based on the information about a first action to protect private information, to the private information protection subject, by wired or wireless communication, wherein the image capturing consent information collector is configured to receive information about a second action to protect private information with respect to the image captured based on the information about a first action to protect private information, from the private information protection subject, by wired or wireless communication, wherein each of the information about a first action and the information about a second action includes a request for taking action to protect private information to a portion of the captured image which is vulnerable to private information infringement, wherein the information about a first action is transmitted in advance before image capturing by the unmanned aerial vehicle and the information about a second action is transmitted afterwards with respect to the captured image.

9. The apparatus for claim 8, wherein the information about an area to capture received by the image capturing area information collector comprises at least one selected from the group consisting of items related to private information generated by image capturing, information related to the unmanned aerial vehicle and the unmanned aerial vehicle pilot, and information related to a flight area of then unmanned aerial vehicle.

10. The apparatus for claim 8, wherein the private information protection subject to which the image capturing area information transmitter transmits the information about an area to capture comprises an individual, an organization, or a national organization who is vulnerable to private information infringement due to image capturing by the unmanned aerial vehicle flying over a flight area.

11. The apparatus for claim 8, further comprising a memory portion configured to receive, from the image capturing area information collector, and store the information about an area to capture from the unmanned aerial vehicle or the unmanned aerial vehicle pilot, and
receive, from the image capturing consent information collector, and store information about a first action to protect private information from the private information protection subject.

12. The apparatus for claim 8, further comprising a controller configured to control the image capturing area information collector, the image capturing area information transmitter, the image capturing consent information collector, and the image capturing consent information transmitter.

13. The apparatus of claim 8, wherein the image capturing area information transmitter is configured to transmit a report on a result of the first action to protect private information with the image captured based on the information about a first action to protect private information, to the private information protection subject, by wired or wireless communication.

14. The apparatus of claim 12, wherein the controller is further configured to take a second action to protect private information with respect to the image captured based on the information about a first action to protect private information and received from the private information protection subject.

15. The apparatus of claim 14, wherein the image capturing consent information transmitter is further configured to transmit an image obtained by taking the second action to protect private information with respect to the image captured based on the information about a first action to protect private information, to the unmanned aerial vehicle or the unmanned aerial vehicle pilot, by wired or wireless communication.

16. A system for protecting private information from illegal photography by an unmanned aerial vehicle, the system comprising:
an unmanned aerial vehicle or an unmanned aerial vehicle pilot configured to transmit information about an area to capture, in advance, by wired or wireless communication, and receive information about a first action to protect private information accompanying image capturing with respect to the area to capture, by wired or wireless communication;
a private information protection subject who wants to protect private information about the area to capture configured to receive information about an area to capture, in advance, by wired or wireless communication, and transmit information about a first action to protect private information; and
a private information protection apparatus configured to receive information about an area to capture, from the unmanned aerial vehicle or the unmanned aerial vehicle pilot, in advance, by wired or wireless communication, transmit the information about an area to capture, to the private information protection subject, by wired or wireless communication, receive information about a first action to protect private information, from the private information protection subject, by wired or wireless communication, and transmit the information about a first action to protect private information, the information being received from the private information protection subject, to the unmanned aerial vehicle or the unmanned aerial vehicle pilot who is going to capture an image, by wired or wireless communication,
wherein the unmanned aerial vehicle or the unmanned aerial vehicle pilot is further configured to transmit the image captured based on the information about a first action to protect private information image to the private information protection apparatus, by wired or wireless communication,
wherein the private information protection apparatus is further configured to transmit the image captured based on the information about a first action to protect private information and received from an unmanned aerial vehicle or an unmanned aerial vehicle pilot, to the private information protection subject, by wired or wireless communication,
wherein the private information protection subject is further configured to transmit information about a second action to additionally protect private information with respect to the image captured based on the information about a first action to protect private information, to the private information protection apparatus, by wired or wireless communication,
wherein each of the information about a first action and the information about a second action includes a request for taking action to protect private information to a portion of the captured image which is vulnerable to private information infringement,
wherein the information about a first action is transmitted in advance before image capturing by the unmanned aerial vehicle and the information about a second action is transmitted afterwards with respect to the captured image.

17. The system of claim 16, wherein the private information protection apparatus is further configured to take a second action to protect private information with respect to the image captured based on the information about a first action to protect private information.

18. The system of claim 17, wherein the private information protection apparatus is further configured to transmit an image obtained by taking the second action to protect private information with respect to the image captured based on the information about a first action to protect private information, to the unmanned aerial vehicle or the unmanned aerial vehicle pilot, by wired or wireless communication.

* * * * *